United States Patent
Wu et al.

(10) Patent No.: US 10,965,885 B2
(45) Date of Patent: Mar. 30, 2021

(54) CLOTHES AND ACCESSORIES FITTING METHOD, DISPLAY SYSTEM AND COMPUTER-READABLE RECORDING MEDIUM THEREOF

(71) Applicant: Wistron Corporation, New Taipei (TW)

(72) Inventors: Bo-Yi Wu, New Taipei (TW); Hui-Chen Lin, New Taipei (TW); Ge-Yi Lin, New Taipei (TW)

(73) Assignee: Wistron Corporation, New Taipei (TW)

(*) Notice: Subject to any disclaimer, the term of this patent is extended or adjusted under 35 U.S.C. 154(b) by 0 days.

(21) Appl. No.: 16/116,916

(22) Filed: Aug. 30, 2018

(65) Prior Publication Data

US 2019/0356868 A1    Nov. 21, 2019

(30) Foreign Application Priority Data

May 16, 2018   (TW) .................. 107116672

(51) Int. Cl.
*H04N 5/272* (2006.01)
*G06T 19/00* (2011.01)
(Continued)

(52) U.S. Cl.
CPC ............. *H04N 5/272* (2013.01); *G06T 7/194* (2017.01); *G06T 19/006* (2013.01);
(Continued)

(58) Field of Classification Search
CPC ........ H04N 5/272; G06T 7/194; G06T 19/006
(Continued)

(56) References Cited

U.S. PATENT DOCUMENTS 7,957,597 B2 * 6/2011 Steinberg ............. G06K 9/0061
382/224
9,727,787 B2   8/2017 Wilf et al.
(Continued)

FOREIGN PATENT DOCUMENTS

| CN | 101271567 | 9/2008 |
| CN | 104813340 | 2/2018 |
| CN | 108022124 | 5/2018 |

OTHER PUBLICATIONS

"Office Action of Taiwan Counterpart Application", dated Mar. 26, 2019, p. 1-p. 11.

*Primary Examiner* — John W Miller
*Assistant Examiner* — Jean W Desir
(74) *Attorney, Agent, or Firm* — JCIPRNET

(57) ABSTRACT

A clothes and accessories fitting method, a display system and a computer-readable recording medium thereof are provided, where the method is applicable to a display system having an image capturing device and a screen and includes the following steps. Images of a user wearing a first apparel appearing in front of the screen are continuously or intermittently captured by using the image capturing device. When a first image of the user in a particular pose is determined to be included in the images, the first image is shot by using the image capturing device. A foreground region and a background region in the first image are segmented, and the background region is processed to generate a processed background region. A first preview image is generated according to the foreground region and the processed background region and displayed on the screen.

22 Claims, 10 Drawing Sheets

(51) Int. Cl.
  *G06T 7/194* (2017.01)
  *H04N 5/232* (2006.01)
  *H04N 5/92* (2006.01)

(52) U.S. Cl.
  CPC . *H04N 5/23219* (2013.01); *G06T 2219/2012* (2013.01); *G06T 2219/2024* (2013.01); *H04N 5/9201* (2013.01); *H04N 2005/2726* (2013.01)

(58) Field of Classification Search
  USPC .... 348/576, 578, 586, 61, 77, 135; 383/103, 383/224
  See application file for complete search history.

(56) References Cited

U.S. PATENT DOCUMENTS

| | | |
|---|---|---|
| 2015/0154453 A1 | 6/2015 | Wilf |
| 2016/0080662 A1* | 3/2016 | Saban ..................... G06T 7/194 348/77 |
| 2018/0122096 A1 | 5/2018 | Yang et al. |
| 2020/0219177 A1* | 7/2020 | He ......................... H04N 5/232 |

\* cited by examiner

CLOTHES AND ACCESSORIES FITTING METHOD, DISPLAY SYSTEM AND COMPUTER-READABLE RECORDING MEDIUM THEREOF

CROSS-REFERENCE TO RELATED APPLICATION

This application claims the priority benefit of Taiwan application serial no. 107116672, filed on May 16, 2018. The entirety of the above-mentioned patent application is hereby incorporated by reference herein and made a part of this specification.

TECHNICAL FIELD

The disclosure relates to a display technology, and more particularly, to a clothes and accessories fitting method, a display system and a computer-readable recording medium thereof.

BACKGROUND

While a consumer is buying clothes or accessories at a physical store, he/she would normally need to try them on repeatedly to select the most satisfying pieces. However, the consumer may not only feel time-consuming and tedious, but may also occupy a fitting room for a considerable amount of time. One prior art has proposed a virtual clothes fitting product which captures an image of the user by using a camera and adds virtual clothes onto the captured image. The image of the virtual clothes under such simulated environment may not match with the figure of the user and may look unreal. Further, after such repeated fitting, with the lack of functions for the user to compare visual differences among multiple sets of clothes at the same time, users can only select more appropriate pieces by memory.

As information technology has been incorporated into many aspects in our daily life, a significant trend has been towards the development of smart products. Hence, to incorporate the existing products into physical stores for interactive fitting and comparison has become a way to optimize life experiences for the consumer.

SUMMARY OF THE DISCLOSURE

The disclosure provides a clothes and accessories fitting method, a display system and a computer-readable recording medium thereof, which are capable of substantially optimizing users' shopping experience in the clothes and accessories fitting process for the user.

In an embodiment of the disclosure, the method is applicable to a display system having an image capturing device and a screen, and includes the following steps. Images of a user wearing a first apparel appearing in front of the screen are continuously or intermittently captured by using the image capturing device. When a first image of the user in a particular pose is determined to be included in the images, the first image is shot by using the image capturing device. A foreground region and a background region in the first image are segmented, and the background region is processed to generate a processed background region. A first preview image is generated according to the foreground region and the processed background region and displayed on the screen.

In an embodiment of the disclosure, the display system includes an image capturing device, a screen, a data storage device and a processor. The processor is coupled to the image capturing device, the screen, and the data storage device. The image capturing device is configured to capture images, and the screen is configured to display images. A capturing direction of the image capturing device is the same as a display direction of the screen. The data storage device is configured to store data. The processor is configured to execute steps of: capturing a plurality of images of a user wearing a first apparel appearing in front of the screen continuously or intermittently by using the image capturing device; when a first image of the user in a particular pose is determined to be included in the images, shooting the first image by using the image capturing device; segmenting a foreground region and a background region in the first image, and processing the background region to generate a processed background region; and generating a first preview image according to the foreground region and the processed background region, and displaying the preview image on the screen.

In an embodiment of the disclosure, the computer-readable recording medium is configured to execute each step in the clothes and accessories fitting method described above.

To make the above features and advantages of the disclosure more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
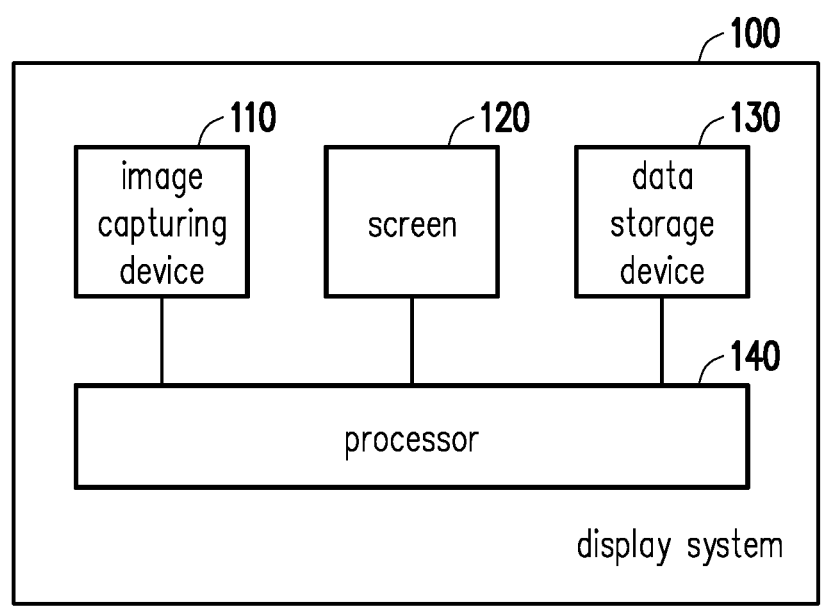
FIG. 1 is a block diagram illustrating a display system according to an embodiment of the disclosure.

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. The embodiments are merely a part of the disclosure rather than disclosing all possible embodiments of the disclosure. More specifically, these embodiments are simply examples of a method, a system and a computer-readable recording medium recited in claims of the disclosure.

FIG. 1 is a block diagram illustrating a display system according to an embodiment of the disclosure. It should, however, be noted that this is merely an illustrative example and the disclosure is not limited in this regard. All components of the display system and their configurations are first introduced in FIG. 1. The functionalities of the components are disclosed in more detail in conjunction with FIG. 2.

With reference to FIG. 1, a display system 100 includes an image capturing device 110, a screen 120, a data storage device 130 and a processor 140. Among them, the processor 140 is coupled to the image capturing device 110, the screen 120 and the data storage device 130, and the image capturing device 110 is disposed on the same side as the screen 120. In this embodiment, the display system 100 may be an all-in-one display formed by integrating the image capturing device 110, the screen 120, the data storage device 130 and the processor 140 together. In another embodiment, the display system 100 may be a computer system having the screen 120, the data storage device 130 and the processor 140. In this case, the image capturing device 110 is externally connected to the computer system, and a capturing direction of the image capturing device 110 is the same as a display direction of the screen 120 (e.g., both facing forward). In other embodiments, the display system 100 may also be an electronic device having image capturing functions and display functions, such as a large tablet computer. The disclosure is not limited in this regard.

The image capturing device 110 is configured to capture images appearing in front of the screen 120 and includes a camera lens having a lens and photosensitive elements. The photosensitive elements are configured to sense an intensity of light ray entering the lens in order to generate an image. The photosensitive elements may be, for example, charge coupled device (CCD) elements, complementary metal-oxide semiconductor (CMOS) elements or the like, which are not particularly limited in the disclosure.

The screen 120 is configured to display images. In this embodiment, the screen 120 may be a liquid crystal display (LCD), a light emitting diode (LED) display, an organic light emitting diode (OLED) display or displays of other types.

The data storage device 130 is configured to store data including images, programming codes, setting values or the like, and may be, for example, a stationary or mobile device in any form such as a random access memory (RAM), a read-only memory (ROM), a flash memory, a hard drive or other similar devices, integrated circuits or a combination of the above.

The processor 140 is configured to control operations between the components in the display system 100, and may be, for example, a central processing unit (CPU), or other programmable devices for general purpose or special purpose such as a microprocessor, a digital signal processor (DSP), a programmable controller, an application specific integrated circuit (ASIC), a programmable logic device (PLD) or other similar devices or a combination of above-mentioned devices.

Embodiments are provided below with reference to each element in the display system 100 of FIG. 1, and served to describe detailed steps in a display method executed by the display system 100.

Figure 2:
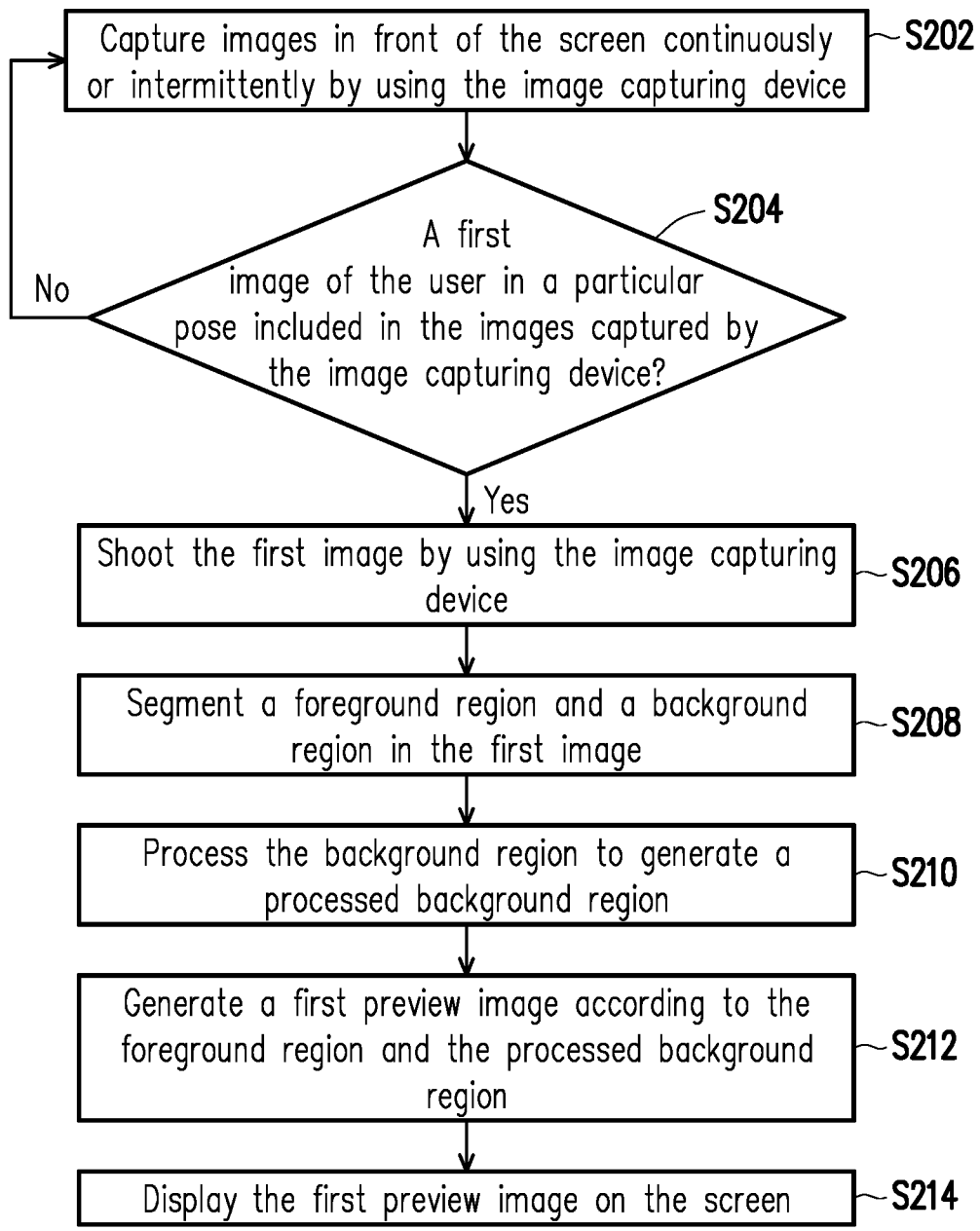
FIG. 2 is a flowchart illustrating a clothes and accessories fitting method according to an embodiment of the disclosure.

FIG. 2 is a flowchart illustrating a clothes and accessories fitting method according to an embodiment of the disclosure, and the flow of FIG. 2 may be realized by the display system 100.

Referring to FIG. 1 in conjunction with FIG. 2, first of all, the processor 140 of the display system 100 captures a plurality of images in front of the screen 120 continuously or intermittently by using the image capturing device 110 (step S202). Here, the processor 140 may start capturing live images by using the image capturing device 110 when the display system 100 is activated or at a particular time (e.g., an opening time of the store).

Next, the processor 140 determines whether a first image of the user in a particular pose is included in the images captured by the image capturing device 110 (step S204). If not, the process returns to step S202 so the images appearing in front of the screen 120 can be continuously or intermittently captured. If yes, when determining that the first image of the user in the particular pose is captured by the image capturing device 110, the processor 140 shoots the first image by using the image capturing device 110 (step S206). Here, it is assumed that the user in the first image is wearing the first apparel. The processor 140 may determine whether a pose of the user in the images matches the particular pose by using a skeleton detection algorithm, which may be realized by, for example, directing adopting OpenCV computer visual database or a skeleton detection function provided by Kinect software development tools. The so-called pose may refer to pose and orientation of the body with respect to the screen or the image capture device 110 (e.g., turning 30 degrees with respect to the screen), and the particular pose may be a pose predefined by the processor 140 (e.g., turning 30 degrees, 45 degrees, 90 degrees) and used to facilitate the user to watch and compare wearing effects in different poses.

Next, the processor 140 segments a foreground region and a background region in the first image (step S208), processes the background region to generate a processed background region (step S210), and generates a first preview image according to the foreground region and the processed background region (step S212). Here, the processor 140 may segment the foreground region and the background region in the first image by using a foreground-background segmentation. The foreground region refers to a region where the user is located, and the background region is a region outside the foreground region. Next, the processor 140 may perform blur process or replacement processing on the background region. In this way, the processed background region may further highlight the user and the first apparel being worn in the foreground regions so the first preview image can have a better visual effect. Afterwards, the processor 140 displays the first preview image on the screen 120 (step S214) for user viewing.

For better comprehension, the actual application method and details of FIG. 2 are described more specifically below with reference to FIG. 3, which is a functional flowchart illustrating a clothes and accessories fitting method according to another embodiment of the disclosure. The flow in the method of FIG. 3 may also be realized by the display system 100.

Figure 3:
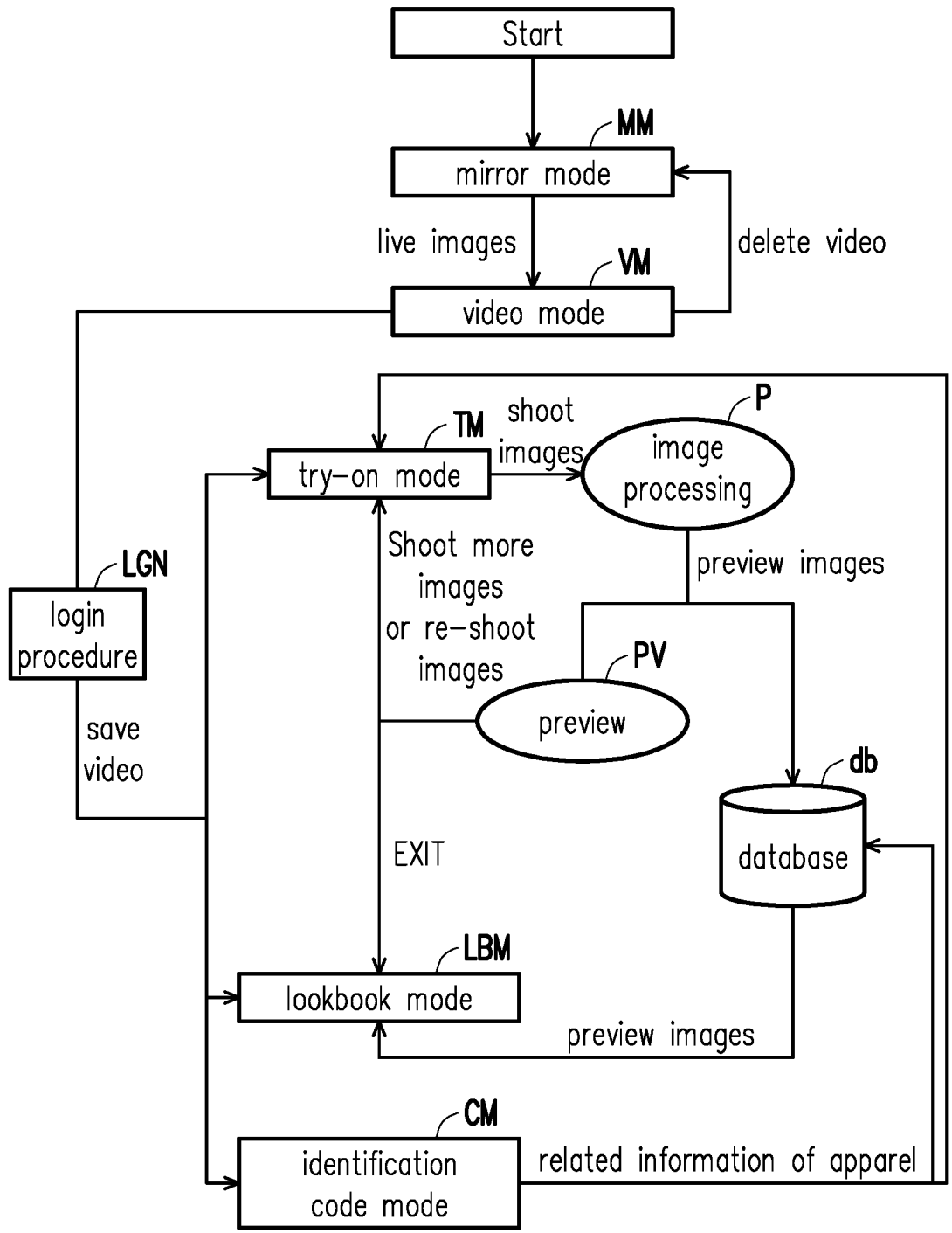
FIG. 3 is a flowchart illustrating a clothes and accessories fitting method according to another embodiment of the disclosure.

Referring to FIG. 1 in conjunction with FIG. 3, after the display system 100 is activated, the processor 140 presets the display system 100 to enter a mirror mode MM so as to allow live images captured by the image capturing device 110 to be displayed on the screen 120 in real time. In other words, in the mirror mode MM, because the images presented on the screen 120 provides a mirror-reflection effect, the display system 100 can provide a dressing mirror function.

On the other hand, in the mirror mode MM, the processor 140 simultaneously determines whether a potential user is included (i.e., whether any human body is detected) in the live images captured by the image capturing device 110 by using, for example, a human detection algorithm. If the processor 140 determines that the potential user is not included in the live images, the processor 140 would not change the mode of the display system 100. In other words, the display system 100 would stay in the mirror mode MM. If the processor 140 determines that the potential user is included in the live images, the processor 140 would set the display system 100 to enter a video mode VM.

In the video mode VM, in addition to continuously or intermittently displaying the live images captured by the image capturing device 110 on the screen 120 in real time, the processor 140 would further activate a video function so as to store the live images in the data storage device 130 in a video format. In addition, in the video mode VM, the processor 140 would continuously or intermittently detect whether the potential user is included in the live images (i.e., whether the potential user continuously stays or leaves). When the processor 140 determines that the potential user in the live images leaves, the potential user may simply be a clerk or a customer passing by the image capturing device 110 instead of the user who wishes to use the display system 100. In this case, the processor 140 would set the display system 100 to leave the video mode VM, return to the mirror mode MM, and delete the recorded video.

In this embodiment, when detecting that the potential user logs into the display system 100 by executing a login procedure LGN through an input device (not illustrated), the processor 140 would determine that this potential user is indeed an authorized user of the display system 100. Next, the processor 140 would set the display system 100 to leave the video mode VM, store the recorded video in a database db, and allow the user to select one of a try-on mode TM, a lookbook mode LBM and an identification code mode CM to be entered through the input device. Here, the database db may be stored in the data storage device 130 or a cloud storage system. The disclosure is not limited in this regard. According to login data of the user, the processor 140 may store the video to a dedicated space of the user in the database db. The processor 140 can allow the user to watch the video recording a fitting process so the user can understand clothing features better.

It should be noted that, in another embodiment, the login procedure LGN may also be omitted. For example, when determining that the potential user intends to use the display system 100 (e.g., when a time that the potential user stays in front of the screen 120 is greater than a time threshold, or when the potential user or anyone presses down a particular button on the input device or touches a touch screen, or the potential user makes a specific gesture in front of the image capturing device 110), the processor 140 would directly determine that this potential user is indeed the authorized user of the display system 100. Similarly, the processor 140 would set the display system 100 to leave the video mode VM, store the recorded video in the database db, and allow the user to select one of the try-on mode TM, the lookbook mode LBM and the identification code mode CM to be entered through the input device.

In the identification code mode CM, the display system 100 can allow the user to search for related information of an apparel. The user can move an identification code on the apparel towards the image capturing device 110 for scanning so as to obtain the related information of such apparel. Here, the identification code on the apparel may be a linear barcode (e.g., barcode), a 2D barcode (e.g., QR code), or a combination of other numbers, texts, symbols, and the like. From another perspective, when determining that an identification code image having the identification code is captured by the image capturing device 110, the processor 140 would set the display system 100 to enter the identification code mode CM, and display the related information of the apparel on the screen 120 for user reference according to that identification code. In addition to the related information of the apparel rapidly provided for the user, the identification code mode CM may further allow the processor 140 to directly obtain the apparel currently held or worn by the user so as to save the trouble of identifying the apparel from the images. Further, the processor 140 also stores the related information of the apparel searched by the user in the database db to facilitate subsequent applications.

Figure 4:
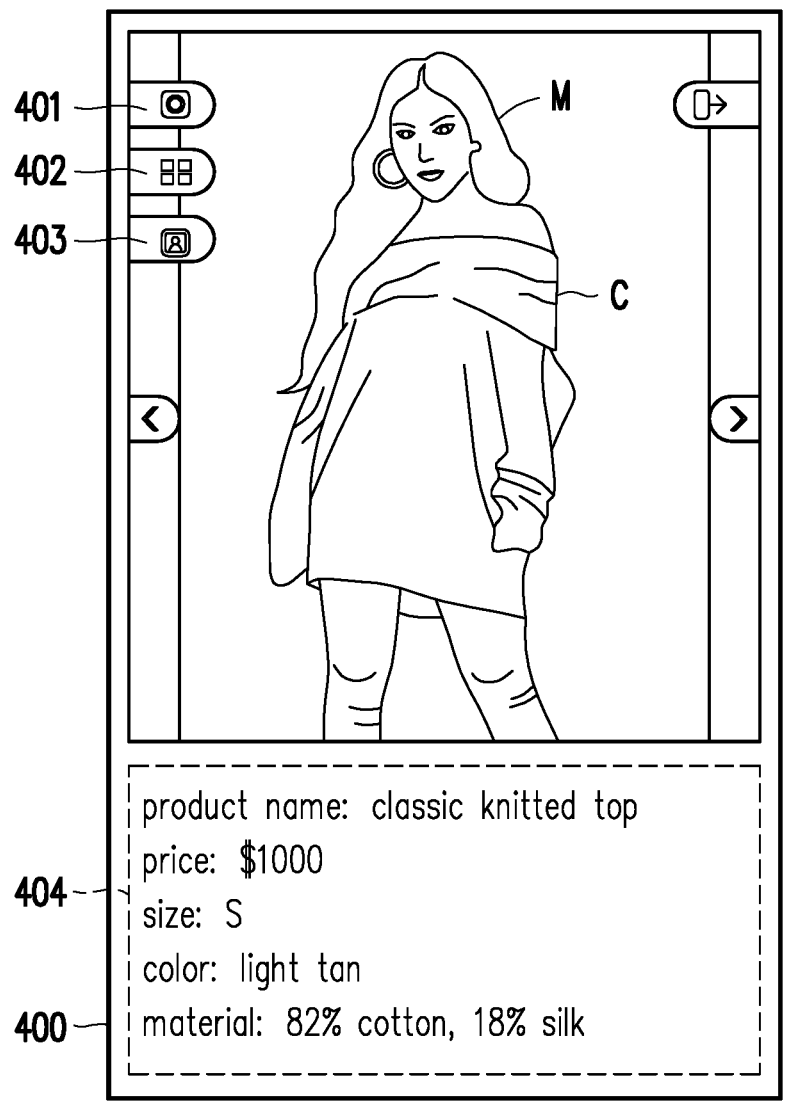
FIG. 4 is a schematic diagram illustrating related information of an apparel according to an embodiment of the disclosure.

FIG. 4 is a schematic diagram illustrating related information of an apparel according to an embodiment of the disclosure. In view of FIG. 4 with reference to FIG. 1 and FIG. 3, when detecting an identification code image of an apparel C, the processor 140 would display an image of a model M wearing the apparel C and related information 404 of the apparel C (e.g., product name, price, size, color shade, material and the like) by an interface 400. In this embodiment, the processor 140 can further allow the user to select on options for reusing the identification code mode 401, leaving the scan mode 402 and directly entering the try-on mode 403 through the interface 400. When the user selects the option for reusing the identification code mode 401, the processor 140 would close the interface 400, and set the display system 100 to re-enter the identification code mode CM for allowing the user to search for related information of other apparels. When the user selects the option for leaving scan mode 402, the processor 140 would close the interface 400, and allow the user to re-select one of the try-on mode TM, the lookbook mode LBM and the identification code mode CM. When the user selects the option for directly entering try-on mode 403, the processor 140 would close the interface 400, and set the display system 100 to enter the try-on mode TM. In addition, the processor 140 would also store all the related information of the apparels searched by the user together in the database db. Incidentally, the display system 100 may also provide only general functions of the identification code mode CM when the user is not logged in, so that anyone can search for the related information of interested apparels at any time.

Referring back to FIG. 3, in the try-on mode TM, the processor 140 may determine whether the pose of the user in the images matches the particular pose, and accordingly determine whether to drive the image capturing device 110 for shooting. Here, the particular pose may be a pose predefined by the processor 140 or a representative pose, such as front, back, left and right of the body facing in front of the screen 120 (which are respectively referred as "forward pose", "backward pose", "leftward pose" and "rightward pose" hereinafter).

Figure 5:
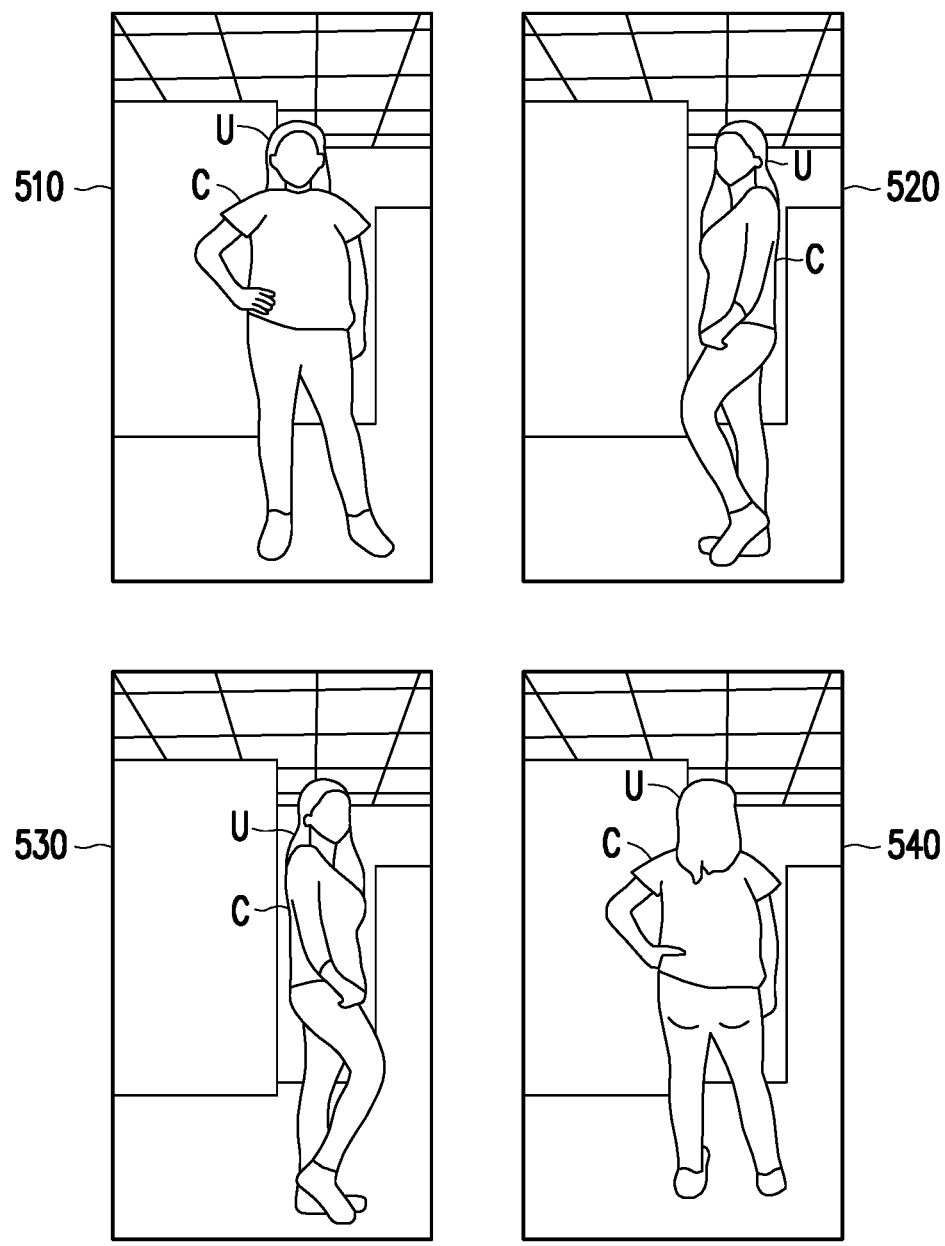
FIG. 5 is a schematic diagram illustrating images corresponding to different poses according to an embodiment of the disclosure.

In the schematic diagram of images corresponding to difference poses illustrated in FIG. 5 according to an embodiment of the disclosure, for example, an image 510, an image 520, an image 530 and an image 540 are images of a user U wearing the apparel C which are shot in accordance with "forward pose", "backward pose", "leftward pose" and "rightward pose", respectively. However, in other embodiments, the particular pose capable of driving the image capturing device 110 for shooting may be further defined in response to store or user needs so as to provide the wearing effects in more angles and orientations for user reference.

Assume that the user is wearing the first apparel. Afterimages of different poses are shot by the image capturing device 110, the processor 140 would perform an image processing P on these images. The processing of an image having "forward pose" (hereinafter, referred to as the "first image") among these images is described below with reference to FIG. 6, which is the flowchart of illustrating the image processing according to an embodiment, in conjunction with the image schematic diagram, and images corresponding to other poses can be deduced in a same fashion.

Figure 6:
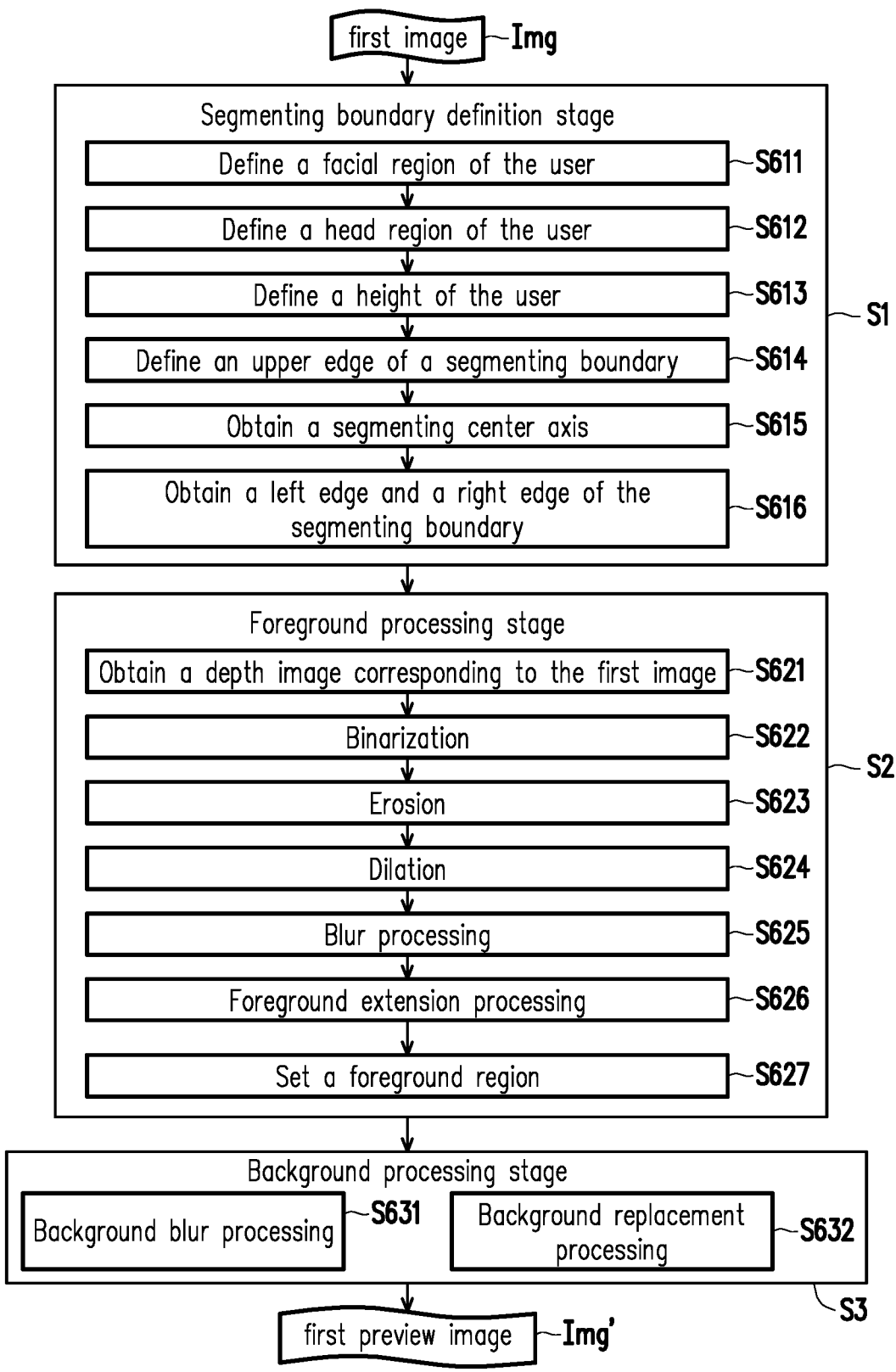
FIG. 6 is a flowchart illustrating an image processing according an embodiment of the disclosure.

With reference to FIG. 6, after obtaining a first image Img, the processor 140 executes procedures including a segmenting boundary definition stage S1, a foreground processing stage S2 and a background processing stage S3.

In the segmenting boundary definition stage S1, the processor 140 would define a boundary of a foreground segmented region. First of all, the processor 140 performs facial detection on the first age to define a facial region of the user (step S611). Here, the processor 140 may define the facial region by using a face detection algorithm, such as Haar-like feature extraction. Taking the schematic diagram of a first image 700 illustrated in FIG. 7 according to an embodiment of the disclosure as an example, the facial region is a region encompassed by a frame 710.

Figure 7:
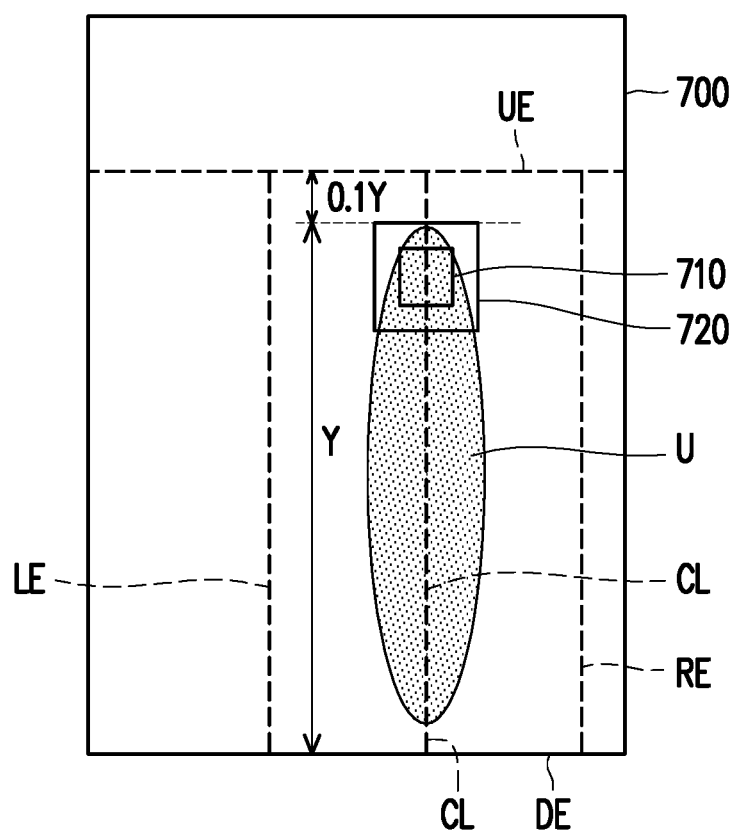
FIG. 7 is a schematic diagram illustrating a first image according to an embodiment of the disclosure.

Next, the processor 140 defines a head region of the user according to the facial region (step S612). Here, the processor 140 may expand the facial region to twice of its original size to generate the head region. Here, the expanding factor of the facial region is an empirical value, and yet the disclosure is not limited thereto. In the example of FIG. 7, the head region is a region encompassed by a frame 720.

Next, the processor 140 defines a height of the user according to the facial region (step S613). For instance, the processor 140 may estimate the height of the user in the first image 700 with the top of the head region as an upper edge and the bottom of the first image as a lower edge. Taking FIG. 7 as an example, the height of the user in the first image 700 is Y. In this embodiment, to avoid estimation errors, the processor 140 defines an upper edge of a segmenting boundary (step S614) at the height of the user in the first image increased by, for example, 0.1Y, so as to obtain a height of the segmenting boundary. Here, the increment factor of 0.1 is also an empirical value. In the example of FIG. 7, the upper edge of the segmenting boundary is UE.

Next, the processor 140 obtains a segmenting center axis by a center of the facial region (step S615) and obtains a left edge and a right edge of the segmenting boundary according to a preset ratio and the height of segmenting boundary (step S616). Here, the preset ratio may be an original ratio of the first image (e.g., 10:16) or a ratio defined by other developers. In the example of FIG. 7, the segmenting center axis is CL, and the left edge and the right edge of the segmenting boundary are LE and RE respectively. Incidentally, in this embodiment, the lower edge of the segmenting boundary is the bottom of the first image (e.g., DE in FIG. 7).

After defining the segmenting boundary, the processor 140 enters the foreground processing stage S2. Here, it should be noted that, the foreground processing stage S2 is mainly realized with use of depth information corresponding to the first image. In order to detect the depth information in front of the screen 120, the display system 100 of the present embodiment may be additionally disposed with depth sensors (not illustrated) at the same side as the screen 120, and said depth sensors may be an active depth sensor and a passive depth sensor. The active depth sensor may calculate the depth information in front of the screen 120 by actively emitting signals including light source, ultrasonic, laser. On the other hand, the passive depth sensor may be, for example, another image capturing device which cooperates with the image capturing device 110 to capture two images in front of the screen 120 from different viewing angles at the same time, so as to calculate for the depth information in front of the screen 120 by using disparities between the two images.

In the foreground processing stage S2, the processor 140 obtains a depth image corresponding to the first image (step S621) and performs binarization on the depth image (step S622) to accordingly generate a plurality of foreground pixels. Here, the foreground pixels are pixels with a pixel value of 255 (white color) after being processed by binarization.

Next, the processor 140 performs erosion (step S623), dilation (step S624) and blur processing (step S625) on the foreground pixels to generate foreground depth pixels. It should be apparent to those skilled in the art that, erosion can eliminate fragmentary foreground pixels, dilation can recover eroded edges, and blur processing can smooth out unsmooth edges caused by erosion and dilation to obtain integral foreground depth pixels with smooth edges.

In general, the foreground depth pixels obtained through aforesaid steps would often show an edge shrinkage, which refers to a situation where the eroded edges cannot be recovered even after dilation. Accordingly, the processor 140 further performs a foreground extension processing on the foreground depth pixels according to pixel values of the first image (step S626), so as to set a background depth pixel neighboring to and having a similar pixel value to the foreground depth pixels as one of the foreground depth pixels.

Figure 8:
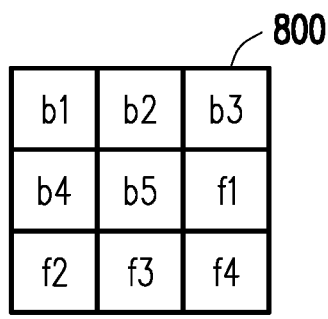
FIG. 8 is a schematic diagram illustrating settings for a depth block according to an embodiment of the disclosure.
Figure 8:
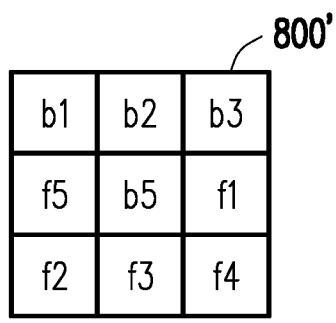

Taking the schematic diagram illustrating settings for a depth block in FIG. 8 as an example, it is assumed that the background depth pixels are b1 to b5 and the foreground depth pixels are f1 to f4 in a depth pixel block 800. The processor 140 may first perform a pixel value comparison on the background depth pixel neighboring to the foreground depth pixels f1 to f4. For example, the background depth pixel b4 is first compared with values (e.g., averages) of three color channels RGB corresponding to the foreground depth pixels f2 to f3. For instance, it is assumed that RGB values corresponding to the background depth pixel b4 are $R_{b4}$, $G_{b4}$ and $B_{b4}$, and averages of RGB values corresponding to the foreground depth pixels f2 to f3 are $R_{avg}$, $G_{avg}$ and $B_{avg}$. The processor 140 would compare $R_{b4}$ with $R_{avg}$, $G_{b4}$ with $G_{avg}$, and $B_{b4}$ with $B_{avg}$. If the differences of the three color channels RGB are all less than a preset pixel threshold (e.g., 10), the processor 140 would determine that the background depth pixel b4 is similar to the foreground depth pixels f2 to f3, and change the background depth pixel b4 to be a foreground depth pixel f5 so as to generate an updated depth pixel block 800'. Then, the processor 140 would compare background depth pixel b5 with the RGB values corresponding to the foreground depth pixels f1 to f5 according to the method above. If the differences between the background depth b5 and the foreground depth pixels f1 tot f5 are overly large, the processor 140 would not change the setting for the background depth pixel b5.

As a side note, the foreground extension processing often leads to a floor extension issue, i.e., a continuous block composed of the floor being mistakenly determined as the foreground. Accordingly, in this embodiment, the processor 140 may solve such issue according to FIG. 9A to FIG. 9B, which are schematic diagrams illustrating a foreground extension correction according to an embodiment of the disclosure.

Figure 9A:
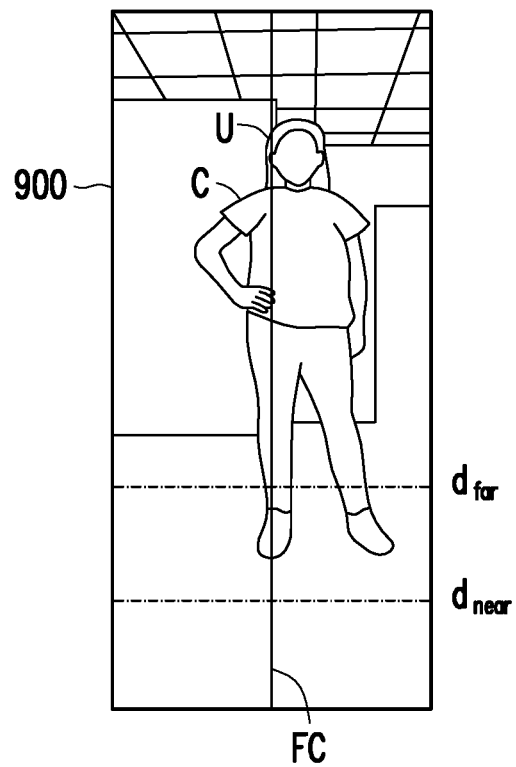
FIG. 9A to FIG. 9B are schematic diagrams illustrating a foreground extension correction according to an embodiment of the disclosure.
Figure 9B:
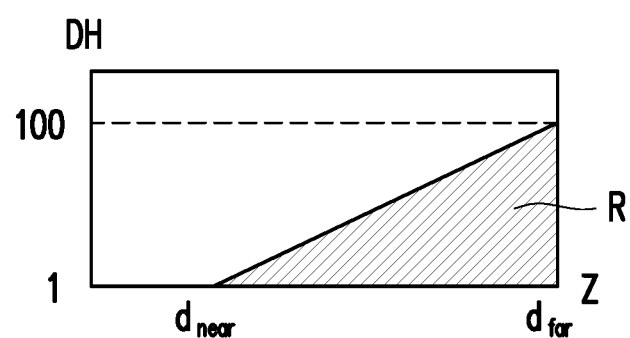

With reference to FIG. 9A, after obtaining a first image 900, the processor 140 would create a depth-distance relationship table DH-Z according to a midline FC of a depth image as shown in FIG. 9B. Because the field for shooting the first image is fixed, the processor 140 can obtain a possible location range of the user U, i.e., at a location between a line $d_{far}$ and a line $d_{near}$, according to an optimal shooting distance. Here, the shooting range may be, for example, between 1.6 m and 2.6 m with respect to the image capturing device 110. Next, the processor 140 can obtain a depth information range R between the line $d_{far}$ and the line $d_{near}$ according to the depth (DH)-distance (Z) relationship table DH-Z, and filter out those originally determined as the foreground depth pixels but having the depth information greater than the depth information range.

Referring back to FIG. 6, after obtaining the foreground depth pixels, the processor 140 defines pixels corresponding to the foreground depth pixels (hereinafter, also referred to as "foreground plane pixels") in the foreground segmented region in the first image to be set as a foreground region (step S627). On the other hand, the processor 140 sets a region outside the foreground region in the first image as a background region and enters the background processing stage S3.

In this embodiment, the processor 140 allows the user to choose one from two background processing methods—a background blur processing (step S631) or a background replacement processing (step S632). Afterwards, the processor 140 would generate a first preview image Img' corresponding to the first apparel according to the foreground region and the processed background region so as to finish the flow for processing the first image Img. For the background blur processing, the processor 140 may perform processing like Gaussian blur on the background region so the processed background region can be diluted to thereby highlight a main body of the foreground region. For the background replacement processing, the processor 140 may first determine whether the related information of the first apparel is stored in the database db (i.e., the user has already scanned the identification code of the first apparel by using the image capturing device 110). When determining that the related information of the first apparel is not stored in the database db, the processor 140 would replace an original background region by a preset background as the processed background region. Here, the preset background may be a background preset by the system, such as a single color background. When determining that the related information of the first apparel is stored in the database db, the processor 140 may obtain a main color shade of the first apparel from the related information of the first apparel such that a contrasting color of the main color shade may be obtained from a conventional color wheel and used as the single color background (or the contrasting color may be used to obtain a background with the contrasting color as a main color) to also highlight the main body of the foreground region.

Referring back to FIG. 3, after processing the preview images corresponding to the different poses, the processor 140 stores all the preview images corresponding to the first apparel in the database db and provided as a preview PV for the user. It should be noted that, the processor 140 may display the preview images one by one on the screen 120 as the preview for the user each time after one preview image is generated, or may display all the preview images on the screen 120 as the preview for the user after all the preview images are generated. Next, when the user chooses to shoot more images or re-shoot images, the processor 140 would set the display system 100 to return to the try-on mode TM. When the user chooses to leave the try-on mode TM or the processor 140 determines that enough preview images are taken, the processor 140 would set the display system 100 to enter the lookbook mode LBM.

In the lookbook mode LBM, the processor 140 may display all the preview images of the first apparel on the screen 120 at the same time or one at a time, and the user can enlarge a particular image or a partial area thereof. For instance, the processor 140 may display an interactive cursor or a rectangle frame on the screen 120 for the user to perform a selection operation. When the selection operation performed by the user on a particular location on the screen 120 is detected (i.e., when the cursor or the rectangle frame is detected at the specific location on the screen) by the processor 140, the processor 140 may partially enlarge the image area corresponding to the particular location and display the enlarged image area beside the particular location.

The method for generating the first preview image after the image processing on the captured first image of the user wearing the first apparel has been described as the above. Similarly, the same method may also be applied when the user changes to a second apparel, and so on and so forth. In this way, when the preview images of the user wearing different apparels are stored in the database db, in the lookbook mode LBM, the display system 100 can provide the preview images of the user wearing different apparels in the same pose to be watched by the user. For instance, the processor 140 may detect the selection operation performed by the user on one of the poses, and display all the preview images corresponding to the pose designated by the user (collectively referred to as a "designated preview image") on the screen 120.

Figure 10:
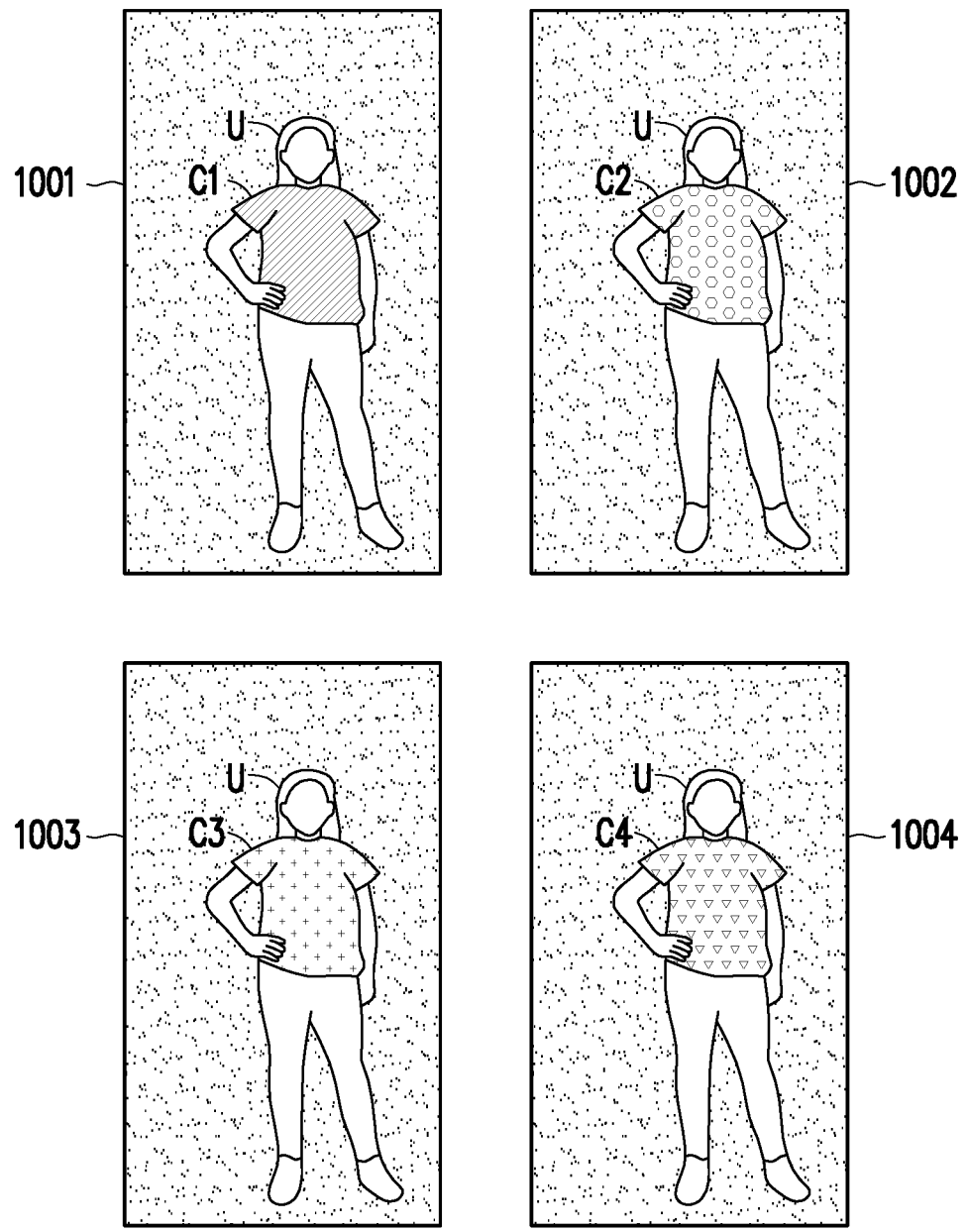
FIG. 10 is a schematic diagram illustrating designated preview images according to an embodiment of the disclosure.

Specifically, FIG. 10 is a schematic diagram illustrating designated preview images according to an embodiment of the disclosure. It is assumed that, when detecting the selection operation performed by the user on "forward pose", the processor 140 would display, at the same time on the screen 120, processed designated preview images 1001 to 1004 of the user U wearing first to fourth apparels C1 to C4 in "forward pose" shot in front of the image capturing device 110 and the screen 120, so the user can compare visual differences among the first to fourth apparels C1 to C4 intuitively.

As a side note, in this embodiment, the processor 140 may set up a storage time limit for the settings in the database db. In other words, when determining that a time length of one preview image stored in the database db exceeds a time threshold (e.g., one season), the processor 140 would delete that preview image.

The disclosure further provides a non-transitory computer-readable recording medium. This computer-readable recording medium can store a plurality of program code segments (e.g., creating an organization diagram program section, approving a list program section, setting a program section, and deploying a program section). The steps in the clothes and accessories fitting method above may be completed after these program code segments are loaded and executed by the processor 140 of the display system 100.

In summary, with the clothes and accessories fitting method, the display system and the computer-readable recording medium thereof proposed by the disclosure, in addition to providing a normal dressing mirror function for displaying clothing images of the user in real time, the visual effects of the clothing images may be further enhanced through image processing. Moreover, the disclosure further provides the images of the user wearing different apparels being shot to be viewed by the user along with the related information of the apparels for user reference. As a result, the number of times that the user repeatedly tries on a same apparel as well as his/her shopping time may be reduced, and shopping experiences at physical stores for the user may be thereby optimized.

Although the present disclosure has been described with reference to the above embodiments, it will be apparent to one of ordinary skill in the art that modifications to the described embodiments may be made without departing from the spirit of the disclosure. Accordingly, the scope of the disclosure will be defined by the attached claims and not by the above detailed descriptions.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A clothes and accessories fitting method, applicable to a display system having an image capturing device and a screen, comprising:
    capturing a plurality of images of a user wearing a first apparel appearing in front of the screen continuously or intermittently by using the image capturing device;
    in response to a determination that a pose of the user of a first image of the plurality of images matches a particular pose, shooting the first image by using the image capturing device;
    segmenting a foreground region and a background region in the first image, and processing the background region to generate a processed background region, wherein the step of segmenting the foreground region and the background region in the first image comprises:
    performing facial detection on the first image to define a facial region;
    defining a foreground segmented region in the first image according to the facial region;
    obtaining a depth image corresponding to the first image;
    performing binarization on the depth image to accordingly generate a plurality of foreground depth pixels;
    defining and setting a plurality of foreground plane pixels corresponding to the foreground depth pixels in the foreground segmented region as the foreground region; and
    setting a region outside the foreground region in the first image as the foreground region; and
    generating a first preview image according to the foreground region and the processed background region, and displaying the preview image on the screen.

2. The method according to claim 1, wherein during the step of capturing the images of the user wearing the first apparel appearing in front of the screen continuously or intermittently by using the image capturing device, the method further comprises:
    presetting the display system to enter a mirror mode so as to allow the images captured by the image capturing device to be displayed on the screen in real time;
    determining whether there exists a potential user in the images; and
    in response that the potential user is determined to be existed in the images, setting the display system to enter a video mode so as to allow the images captured by the image capturing device to be displayed on the screen and recording the images to generate a recorded video.

3. The method according to claim 2 further comprising:
    in response that the potential user in the images is determined to leave, setting the display system to leave the video mode and to return to the mirror mode and deleting the recorded video.

4. The method according to claim 2 further comprising:
    in response that the potential user is determined to be an authorized user of the display system, setting the display system to leave the video mode and storing the recorded video in a database.

5. The method according to claim 1, wherein before the determination that the pose of the user of the first image of the plurality of images matches the particular pose, the method further comprises:
    setting the display system to enter a try-on mode;
    wherein while the display system is in the try-on mode, after the step of generating the first preview image, the method further comprises:
    setting the display system to leave the try-on mode and displaying the first preview image on the screen.

6. The method according to claim 5, wherein while the display system is in the try-on mode, after the step of generating the first preview image, the method further comprises:
    capturing at least one other first image of the user wearing the first apparel in other poses by using the image capturing device; and
    processing the at least one other first image to generate at least one other first preview image.

7. The method according to claim 6, wherein after the step of generating the first preview image and the at least one other first preview image, the method further comprises:
    storing the first preview image and the at least one other first preview image in a database; and
    setting the display system to leave the try-on mode and enter a lookbook mode.

8. The method according to claim 7, wherein the database further comprises at least one preview image corresponding to at least one other apparel, and wherein in response that the display system enters the lookbook mode, the method further comprises:
    detecting a selection operation performed by the user on a designated pose among a plurality of poses; and
    displaying a plurality of designated preview images corresponding to the designated pose on the screen, wherein each of the designated preview images is associated with a processed image of the user wearing a different apparel in the same designated pose.

9. The method according to claim 1, wherein the step of defining the foreground segmented region in the first image according to the facial region comprises:
    defining a head region of the user according to the facial region;
    calculating a height of the user according to the head region; and defining a boundary of the foreground segmented region according to the facial region and the height of the user.

10. The method according to claim 1, wherein the step of performing binarization on the depth image to accordingly generate the foreground depth pixels comprises:
performing binarization on the depth image to generate a plurality of foreground pixels; and
performing erosion, dilation, and blur processing on the foreground pixels to generate the foreground depth pixels.

11. The method according to claim 10, wherein the step of generating the foreground depth pixels further comprises:
setting a background depth pixel neighboring to and having a similar pixel value to the foreground depth pixels as one of the foreground depth pixels.

12. The method according to claim 10, wherein the step of generating the foreground depth pixels further comprises:
obtaining a distance range of the user with respect to the image capturing device;
obtaining a depth information range corresponding to the distance range according to a depth-distance relationship table; and
filtering out the foreground depth pixels with depth information being greater than the depth information range.

13. The method according to claim 1, wherein the step of processing the background region to generate the processed background region comprises:
performing blur processing on the background region to generate the processed background region.

14. The method according to claim 1, wherein the step of processing the background region to generate the processed background region comprises:
setting a preset background as the processed background region.

15. A clothes and accessories fitting method, applicable to a display system having an image capturing device and a screen comprising:
capturing a plurality of images of a user wearing a first apparel appearing in front of the screen continuously or intermittently by using the image capturing device;
in response to a determination that a pose of the user of a first image of the plurality of images matches a particular pose, shooting the first image by using the image capturing device;
segmenting a foreground region and a background region in the first image, and processing the background region to generate a processed background region, wherein the step of processing the background region to generate the processed background region comprises:
scanning an identification code of the first apparel to obtain related information of the first apparel and thereby obtaining a color shade of the first apparel from the related information;
generating a corresponding background related to a contrasting color of the color shade of the first apparel; and
setting the corresponding background as the processed background; and
generating a first preview image according to the foreground region and the processed background region, and displaying the preview image on the screen.

16. The method according to claim 15, wherein the step of segmenting the foreground region and the background region in the first image comprises:
performing facial detection on the first image to define a facial region;
defining a foreground segmented region in the first image according to the facial region;
obtaining a depth image corresponding to the first image;
performing binarization on the depth image to accordingly generate a plurality of foreground depth pixels;
defining and setting a plurality of foreground plane pixels corresponding to the foreground depth pixels in the foreground segmented region as the foreground region; and
setting a region outside the foreground region in the first image as the foreground region.

17. The method according to claim 16, wherein the step of defining the foreground segmented region in the first image according to the facial region comprises:
defining a head region of the user according to the facial region;
calculating a height of the user according to the head region; and
defining a boundary of the foreground segmented region according to the facial region and the height of the user.

18. The method according to claim 16, wherein the step of performing binarization on the depth image to accordingly generate the foreground depth pixels comprises:
performing binarization on the depth image to generate a plurality of foreground pixels; and
performing erosion, dilation, and blur processing on the foreground pixels to generate the foreground depth pixels.

19. The method according to claim 18, wherein the step of generating the foreground depth pixels further comprises:
setting a background depth pixel neighboring to and having a similar pixel value to the foreground depth pixels as one of the foreground depth pixels.

20. The method according to claim 18, wherein the step of generating the foreground depth pixels further comprises:
obtaining a distance range of the user with respect to the image capturing device;
obtaining a depth information range corresponding to the distance range according to a depth-distance relationship table; and
filtering out the foreground depth pixels with depth information being greater than the depth information range.

21. A display system comprising:
an image capturing device, configured to capture images;
a screen, configured to display images, wherein a capturing direction of the image capturing device is the same as a display direction of the screen;
a data storage device, configured to store data; and
a processor, coupled to the image capturing device, the screen, and the data storage device, and configured to:
capture a plurality of images of a user wearing a first apparel appearing in front of the screen continuously or intermittently by using the image capturing device;
in response to a determination that a pose of the user of a first image of the plurality of images matches a particular pose, shoot the first image by using the image capturing device;
segment a foreground region and a background region in the first image, and process the background region to generate a processed background region, wherein the processor is further configured to:
perform facial detection on the first image to define a facial region;
define a foreground segmented region in the first image according to the facial region;
obtain a depth image corresponding to the first image;

perform binarization on the depth image to accordingly generate a plurality of foreground depth pixels;

define and setting a plurality of foreground plane pixels corresponding to the foreground depth pixels in the foreground segmented region as the foreground region; and set a region outside the foreground region in the first image as the foreground region; and generate a first preview image according to the foreground region and the processed background region, and display the preview image on the screen.

22. A non-transitory computer-readable recording medium, recording computer programs to be loaded and executed by a processor of a display system having an image capturing device and a screen to perform steps of:

capturing a plurality of images of a user wearing a first apparel appearing in front of the screen continuously or intermittently by using the image capturing device;

in response to a determination that a pose of the user of a first image of the plurality of images matches a particular pose, shooting the first image by using the image capturing device;

segmenting a foreground region and a background region in the first image, and processing the background region to generate a processed background region, wherein the step of segmenting the foreground region and the background region in the first image comprises:

performing facial detection on the first image to define a facial region;

defining a foreground segmented region in the first image according to the facial region;

obtaining a depth image corresponding to the first image;

performing binarization on the depth image to accordingly generate a plurality of foreground depth pixels;

defining and setting a plurality of foreground plane pixels corresponding to the foreground depth pixels in the foreground segmented region as the foreground region; and setting a region outside the foreground region in the first image as the foreground region; and generating a first preview image according to the foreground region and the processed background region, and displaying the preview image on the screen.

\* \* \* \* \*